United States Patent
Huynh et al.

[19]

[11] Patent Number: 6,041,592
[45] Date of Patent: Mar. 28, 2000

[54] CONTROL SYSTEM AND METHOD FOR AN NOX ACCUMULATOR

[75] Inventors: Ngoc-Hoa Huynh, Leonberg; Lorenz K. F. Salzer, Rutesheim; Ralph Stetter, Remshalden, all of Germany

[73] Assignees: Bayerische Motoren AG, Munich; DaimlerChrysler AG, Stuttgart; Dr. Ing. h.c.F. Porsche AG, Weissach, all of Germany

[21] Appl. No.: 08/996,293

[22] Filed: Dec. 22, 1997

[30] Foreign Application Priority Data

Dec. 20, 1996 [DE] Germany .............................. 196 53 756

[51] Int. Cl.[7] ...................................................... F01N 3/00
[52] U.S. Cl. .................. 60/274; 60/295; 60/297; 60/285; 60/286
[58] Field of Search .............................. 60/286, 285, 276, 60/295, 297, 301

[56] References Cited

U.S. PATENT DOCUMENTS

| | | | |
|---|---|---|---|
| 5,343,702 | 9/1994 | Miyajima et al. | 60/301 |
| 5,410,873 | 5/1995 | Tashiro | 60/285 |
| 5,473,887 | 12/1995 | Takeshima et al. | 60/297 |
| 5,479,775 | 1/1996 | Kraemer et al. | 60/285 |
| 5,609,026 | 3/1997 | Berriman et al. | 60/286 |
| 5,657,625 | 8/1997 | Koga et al. | 60/274 |
| 5,771,686 | 6/1998 | Pischinger et al. | 60/297 |
| 5,778,667 | 7/1998 | Kinugasa | 60/274 |

FOREIGN PATENT DOCUMENTS

0598917A1 6/1994 European Pat. Off. .
19517168A1 11/1995 Germany .

OTHER PUBLICATIONS

Patent Abstracts of Japan, vol. 018, No. 691, Dec. 26, 1994, JP06272546A.
Patent Abstracts of Japan, vol. 096, No. 012, Dec. 26, 1996, JP 08200045A.
Patent Abstracts of Japan, vol. 018, No. 691, Dec. 26, 1994, JP06272536A.
Patent Abstracts of Japan, vol. 095, No. 001, Feb. 28, 1995, JP 06280550A.
European Search Report, Apr. 2, 1998.

*Primary Examiner*—Thomas Denion
*Assistant Examiner*—Binh Tran
*Attorney, Agent, or Firm*—Evenson, McKeown, Edwards & Lenahan, P.L.L.C.

[57] ABSTRACT

The invention provides the replacing of the known "macroscopic" processes by a "microscopic" approach control strategy for an NOx accumulator. The regeneration phases after approximately 30 seconds of a lean operation, which last approximately one second in the state of the art, is replaced by a rich operating cycle after a sequence of lean ones. The number of lean operating cycles which can be carried out before a regenerating operating cycle depends on the combustion process of the internal-combustion engine as well as on the construction and the volume of the catalyst.

26 Claims, 1 Drawing Sheet

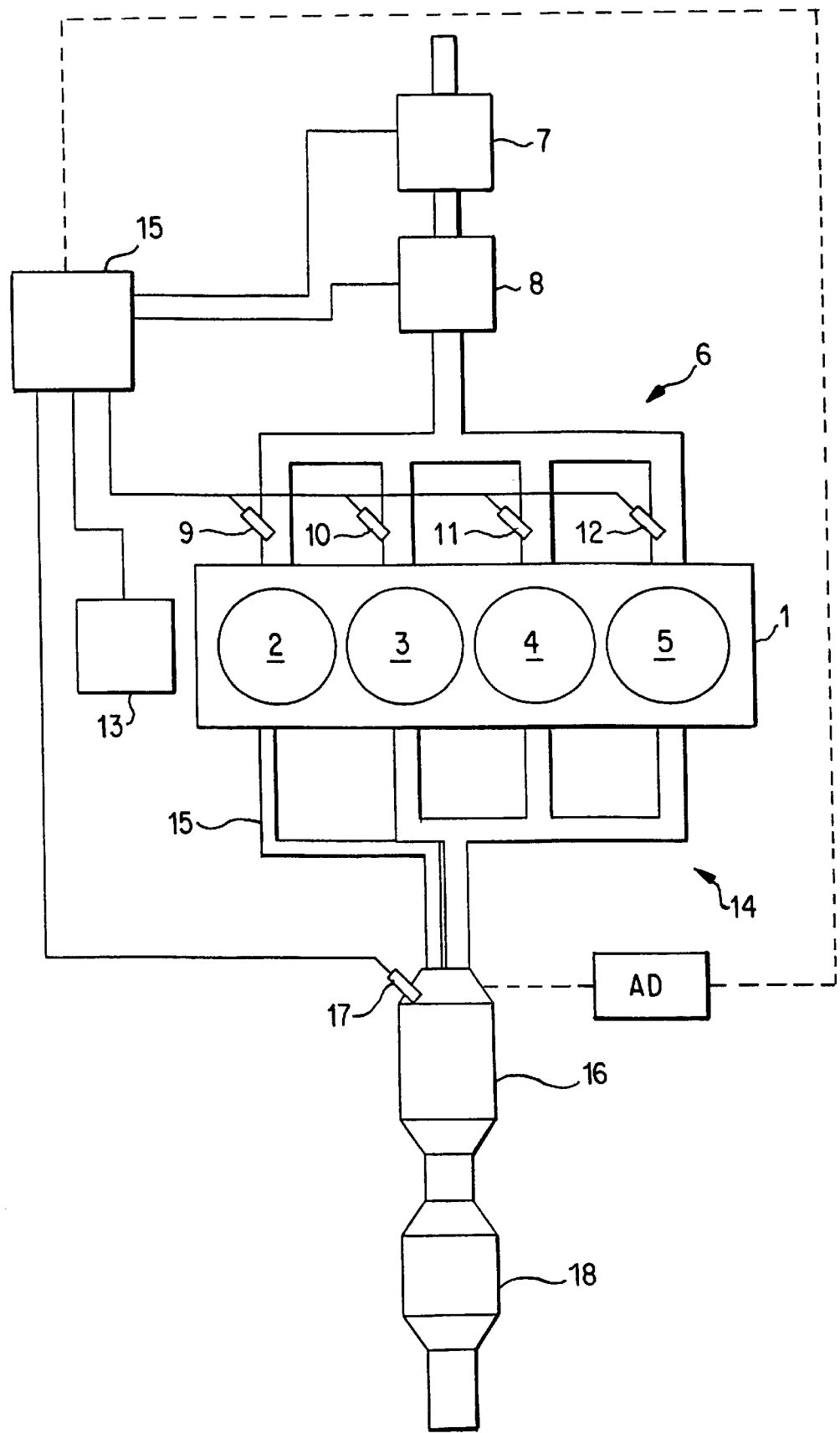

CONTROL SYSTEM AND METHOD FOR AN NOX ACCUMULATOR

BACKGROUND AND SUMMARY OF THE INVENTION

This application claims the priority of German application 196 53 756.8 filed Dec. 20, 1996 in Germany, the disclosure of which is expressly incorporated by reference herein.

The invention relates to a system and process for operating an NOx-accumulator for an internal-combustion engine.

For reasons of consumption, it is desirable to operate spark-ignited Otto engines and diesel engines at lambda >1 during as many operating conditions as possible, in order to reduce the throttling losses during the charge cycle. The achievable lambda values are a function of the mixture preparation concept of the basic engine and, in the case of stratified charge engines or direct-injection engines, may extend up to an 6-fold air excess, that is, lambda=6. For operating conditions of this type, the known three-way catalysts are unsuitable because they operate at high conversion rates only at the operating condition lambda=1, that is, stoichiometric mixture and exhaust gas.

For the operation with an air excess, it is known to use NOx-accumulator catalyst combinations which, during the lean operation, store the NOx in front of the catalyst. For restoring the accumulating capacity of the NOx accumulators, regeneration phases are required with lambda <1.

It is generally known to carry out the following steps for an engine timing in conjunction with an NOx-accumulation and the regeneration of the accumulator:

detection of the loading condition of the NOx-accumulator during the accumulation phase, and apportioning of a reducing agent as a function of the released NOx in the regeneration phase because the reducing agent, unless it is converted together with the NOx, emerges from the exhaust gas system and thus enters into the overall emission balance of the vehicle.

In the case of such an engine timing, the change-over event between the operation with the air excess (accumulator phase) and the operation with the fuel excess (regeneration phase) must not be noticeable by the driver. The known processes operate without exception by means of change-over operations which are controlled with respect to time and whose pulse-width rate, that is, the time relationship between the operating modes, is determined in a more or less high-expenditure manner by detecting the occurring NOx-mass. Furthermore, strategies are known which, by means of an NOx sensor, determine the breakthrough of the NOx accumulator and, as required, trigger a regeneration.

The known processes cause considerable matching expenditures, particularly when taking into account different load conditions. Furthermore, the service life of an NOx-accumulator operated by means of the known processes is limited.

In contrast to this state of the art, it is an object of the invention to provide a process for operating an NOx-accumulator for an internal-combustion engine which is simplified with respect to the determination of the time fractions of the individual operating modes and by means of which the service life of the NOx-accumulator is increased.

In this case, the invention is based on the recognition that the aging behavior of the NOx-accumulators is connected with the accumulating operation. Accordingly, the accumulating operation is connected with a volume change of the accumulated material which over time results in irreversible structural damage in the moderately elastic solid body. In addition, it was found that the NOx-conversion of an overall system formed of the NOx accumulator and the catalyst connected behind it is continuously reduced with an increasing filling of the NOx-accumulator so that NOx increasingly reaches the environment.

The present invention provides the replacing of the known "macroscopic" processes by a "microscopic" approach and determining the regeneration phase on the basis of individual operating cycles of the internal-combustion engine. The regeneration phases after approximately 30 seconds of lean operation which in the state of the art last approximately one second are replaced by an operating cycle with regeneration, for example, a rich operating cycle, after a sequence of operating cycles in which NOx is accumulated, such as lean operating cycles.

An operating cycle advantageously corresponds to a combustion cycle of the internal-combustion engine; that is, the smallest unit to be considered for the exhaust gas formation. Depending on the point of view, it is possible as an alternative to carry out the definition of an operating cycle also on the basis of other systems. Thus, it is possible, for example, to look at the internal-combustion engine as a whole and to define an operating cycle such that it extends from an operating stroke of the first cylinder of the internal-combustion engine to the next operating stroke of the first cylinder.

Different measures are suggested for regenerating the NOx accumulator. The apportioning of the regenerating agent by adjusting a fuel-air mixture with a fuel excess can take place very precisely. The apportioning of the regenerating agent by producing an engine cutout can be implemented particularly easily. The apportioning of the regenerating agent by the metering of fuel, in turn, can take place very precisely; in this case, there is the additional advantage that the regenerating agent does not take part in the combustion operation. Finally, it is suggested for apportioning the regenerating agent to provide a separate apportioning device for a reducing agent upstream of the NOx accumulator. As a result, other reducing agents than the fuel used for operating the internal-combustion engine, such a ammonia, can now also be used.

The number of operating cycles in which NOx is accumulated and which can be carried out before the operating cycle with the regeneration depends on the combustion process of the internal-combustion engine as well as the construction and the volume of the catalyst. This does not change the energy balance of the operation so that no consumption disadvantage occurs in comparison to the state of the art. The NOx accumulator is loaded only minimally, preferably essentially below 10% of its accumulation volume, which precludes the above-described aging operation. In addition, the catalyst connected behind usually operates in a filling condition in the case of which high conversion rates are ensured which are at the level of a three-way catalyst. Since, because of the high regeneration frequency, the probability is very high that, in the operating cycle with the regeneration, the same air mass flow rate will exist as in the operating cycle with NOx accumulating, a consideration of the emission masses is not necessary because the ratio of the NOx accumulation to the regeneration remains constant in all load conditions of the internal-combustion engine. In a particularly simple manner, it is therefore possible to let the operating cycle required for the regeneration follow a fixed number of operating cycles with NOx accumulation.

Slight deviations in the dynamics are compensated by the volume of the NOx accumulator which is large in comparison to the actual loading. In an operation with lambda=1 or richer, as occurs during idling for reasons of vehicle handling or during a full load for power reasons, the whole system is changed back into the condition with a completely emptied accumulator.

In preferred embodiments, the exhaust routing device between the outlet valve and the catalyst is to be designed such that a mixing of successive cylinder contents and thus a reduction of the concentration of the regenerating agent is precluded. This can be achieved by means of an elbow with a junction directly in front of the catalyst with constantly alternating regeneration cylinders. However, configurations are also conceivable in which the regeneration is always assigned to the same cylinder. There, it will be sufficient to carry out the exhaust routing to the catalyst separately for this cylinder. The invention can be applied to diesel internal-combustion engines as well as to Otto internal-combustion engines.

In an alternative or supplementary manner, it may be required in the case of internal-combustion engines with a large number of cylinder and a corresponding overlapping of the outlet phases of the individual cylinders, to use, instead of a single operating cycle for the regeneration, two or more operating cycles for the regeneration which follow one another in the ignition sequence in order to preclude a mixing of successive cylinder contents of different cylinders. This will correspondingly increase the number of intermediate operating cycles with NOx accumulation.

Finally, the number of operating cycles required for the regeneration also depends on the inertia of the NOx accumulator and the inertia of the catalyst so that, also for this reason, two or more operating cycles which follow one another in the ignition sequence may be required for the regeneration.

Other objects, advantages and novel features of the present invention will become apparent from the following detailed description of the invention when considered in conjunction with the accompanying drawings.

BRIEF DESCRIPTION OF THE DRAWINGS

The single drawing FIGURE schematically depicts a system constructed according to preferred embodiments of the present invention.

DETAILED DESCRIPTION OF THE DRAWINGS

An internal-combustion engine 1 with four cylinders 2 to 5 has an intake system 6 with an air mass generator 7 and a throttle valve generator 8. Injection valves 9 to 12 for the fuel metering are arranged in front of the individual cylinders 2 to 5. A crankshaft generator 13 is also provided on the internal-combustion engine.

On the exhaust side, the internal-combustion engine 1 has an exhaust system 14 in which a separate exhaust routing device 15 is provided for the first cylinder 2. Together with the additional part of the exhaust system 14, the separating exhaust routing device 15 leads into an Nox accumulator 16. In the inlet area of the NOx accumulator 16, a probe 17 is arranged which determines the oxygen excess in the exhaust gas. Finally, a catalyst 18 is connected behind the NOx accumulator 16.

A control unit 19 receives the signals of the air mass generator 6, of the throttle valve generator 7, of the crankshaft generator 13 and of the probe 17. By way of the injection nozzles 9 to 12, the control unit 19 controls the fuel metering to the internal-combustion engine 1 for each cylinder.

During the operation, that is, when the internal-combustion engine 1 is warmed up and in a normal operating mode outside the maximal conditions, such as idling and full load, the fuel metering by way of the control unit 19 takes place such that the internal-combustion engine 1 is operated with an excess of air. In the case of this first operating mode, the NOx accumulator 16 receives NOx from the exhaust gas.

For controlling the loading of the NOx accumulator 16, the control unit 19 detects the number of operating cycles—in this case, the number of combustion cycles—of the internal-combustion engine 1: In the case of one rotation of the crankshaft, which is not shown, of the internal-combustion engine 1, two combustion cycles are concluded; thus two operating cycles are counted. In the case of each twenty-eighth operating cycle, the counting taking place with respect to all cylinders 2 to 5, the control unit 19 increases the fuel quantity supplied to the first cylinder 2, so that in the case of the following operating cycle, the first cylinder 2 operates with an excess of fuel and introduces unburnt fuel into the separate exhaust routing device 15. By way of a separate exhaust gas routing device 15, this exhaust gas volume reaches the NOx accumulator 16 in an unmixed condition, which NOx accumulator 16, as the result of the concentration change of the exhaust gas constituents, will now release the accumulated NOx. The NOx, which is released in this manner, together with the unburnt fuel, then arrives in the catalyst 18 and is reduced there.

A separate apportioning device AD, schematically depicted in dash lines in the drawing, for a reducing agent, such as ammonia, can also be provided.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control unit for operating an NOx accumulator for an internal combustion engine, said control unit being operable to control timing of regeneration of the NOx accumulator as a function of a predetermined number of individual operating cycles of the internal combustion engine without requiring measurements of actual Nox in the Nox accumulator.

2. A control unit according to claim 1, wherein said individual operating cycles are combustion cycles of the internal combustion engine.

3. A control unit according to claim 2, wherein the control unit is operable to apportion an excess of fuel during an engine combustion cycle, which excess of fuel forms a regenerating agent for the NOx accumulator.

4. A control unit according to claim 2, wherein the control unit is operable to inhibit ignition at a combustion chamber of the engine during a combustion cycle to thereby control apportioning of regeneration of the NOx accumulator.

5. A control unit according to claim 2, wherein the control unit is operable to meter fuel during an exhaust portion of an engine combustion cycle to thereby control apportioning of regeneration of the Nx accumulator.

6. A control unit according to claim 1, wherein said control unit includes an apportioning device for apportioning a regenerating agent into an exhaust gas flow of the engine at a position upstream of the NOx accumulator.

7. A control unit according to claim 6, wherein said regenerating agent is other than engine fuel supplied to the engine.

8. A control unit according to claim 1, wherein said control unit is operable to apportion a regenerating agent after a predetermined number of engine operating cycles.

9. A control unit according to claim 1, wherein said control unit is operable to regenerate the NOx accumulator at a predetermined frequency such that said regeneration occurs before 10% of the accumulating capacity of the NOx accumulator has been utilized.

10. A control unit according to claim 1, wherein an exhaust routing device is interposed between the internal combustion engine and the NOx accumulator, which routing device is operable to preclude mixing exhaust from different engine cylinders.

11. A control unit according to claim 10, wherein said gas routing device includes an arrangement wherein a separate exhaust gas line is provided for an engine cylinder which is used for apportioning a regenerating agent for the NOx accumulator.

12. A control unit according to claim 1, wherein said control unit is operable to select the number of operating cycles during which a regenerating agent is apportioned such that a mixing of successive cylinder contents of different cylinders is essentially precluded.

13. A control unit according to claim 1, wherein said engine includes plural engine cylinders, and wherein said regeneration of the NOx accumulator is only by way of supply of excess fuel to one of the engine cylinders which has an exhaust line leading to the NOx accumulator separately from other engine cylinder exhaust lines.

14. A method of operating an NOx accumulator timing of for an internal combustion engine, comprising controlling regeneration of the NOx accumulator as a function of a predetermined number of individual operating cycles of the internal combustion engine without requiring measurement of actual NOx in the NOx accumulator.

15. A method according to claim 14, wherein said individual operating cycles are combustion cycles of the internal combustion engine.

16. A method according to claim 15, wherein the controlling regeneration comprises controlling an excess of fuel during an engine combustion cycle, which excess of fuel forms a regenerating agent for the NOx accumulator.

17. A method according to claim 15, wherein the controlling regeneration comprises controlling ignition at a combustion chamber of the engine during a combustion cycle.

18. A method according to claim 15, wherein the controlling regeneration includes metering fuel during an exhaust portion of an engine combustion cycle.

19. A method according to claim 14, wherein said controlling regeneration includes apportioning a regenerating agent into an exhaust gas flow of the engine at a position upstream of the NOx accumulator.

20. A method according to claim 19, wherein said regenerating agent is other than engine fuel supplied to the engine.

21. A method according to claim 14, wherein said controlling regeneration includes apportioning a regenerating agent after a predetermined number of engine operating cycles.

22. A method according to claim 14, wherein said controlling regeneration includes regenerating the NOx accumulator at a predetermined frequency such that said regenerating occurs before 10% of the accumulating capacity of the NOx accumulator has been utilized.

23. A method according to claim 14, wherein an exhaust routing device is interposed between the internal combustion engine and the NOx accumulator, which routing device is operable to preclude mixing exhaust from different engine cylinders.

24. A method according to claim 23, wherein said gas routing device includes an arrangement wherein a separate exhaust gas line is provided for an engine cylinder which is used for apportioning a regenerating agent for the NOx accumulator.

25. A method according to claim 14, wherein said controlling regeneration includes selecting the number of operating cycles during which a regenerating agent is apportioned such that a mixing of successive cylinder contents of different cylinders is essentially precluded.

26. A method according to claim 14, wherein said engine includes plural engine cylinders, and
   wherein said regeneration of the NOx accumulator is only by way of supply of excess fuel to one of the engine cylinders which has an exhaust line leading to the NOx accumulator separately from other engine cylinder exhaust lines.

* * * * *